(12) United States Patent
Studer (10) Patent No.: US 10,105,765 B2
(45) Date of Patent: Oct. 23, 2018

(54) COMBINED DRILL AND CHAMFER TOOL (71) Applicant: Heule Werkzeug AG, Balgach (CH)

(72) Inventor: Harry Studer, Balgach (CH)

(73) Assignee: Heule Werkzeug AG, Balgach (CH)

( * ) Notice: Subject to any disclaimer, the term of this patent is extended or adjusted under 35 U.S.C. 154(b) by 0 days.

(21) Appl. No.: 15/135,725

(22) Filed: Apr. 22, 2016

(65) Prior Publication Data
US 2016/0311037 A1  Oct. 27, 2016

(30) Foreign Application Priority Data

Apr. 24, 2015  (DE) .................... 10 2015 005 250

(51) Int. Cl.
B23B 51/08 (2006.01)
B23B 51/10 (2006.01)
B23B 51/02 (2006.01)

(52) U.S. Cl.
CPC .............. B23B 51/08 (2013.01); B23B 51/02 (2013.01); B23B 51/102 (2013.01);
(Continued)

(58) Field of Classification Search
CPC ..... B23B 51/08; B23B 51/102; B23B 51/108; Y10T 408/8583
See application file for complete search history.

(56) References Cited

U.S. PATENT DOCUMENTS 2,373,474 A * 4/1945 Heyer .................. B23B 51/102
408/224

3,346,894 A * 10/1967 Lemelson ............... B23B 51/08
318/162

(Continued)

FOREIGN PATENT DOCUMENTS

CN      202317174 U  *  7/2012
CN      201120432027      11/2012
(Continued)

OTHER PUBLICATIONS

German Search Report from corresponding German Application 10 2015 005 250.0, dated Nov. 30, 2015, 7 pages.
(Continued)

Primary Examiner — Eric A Gates
(74) Attorney, Agent, or Firm — Wood Herron & Evans LLP (57) ABSTRACT A combined drill and chamfer tool (13, 21) for producing boreholes (29) in a workpiece (28) and for subsequently producing a chamfer (30) on at least one bore edge of the borehole (29), comprising a drill bit (1), which is secured in a rotationally fixed manner in a base body (3), and at least one chamfering blade (4) arranged behind the drill bit (1) in the axial direction, said chamfering blade being mounted in a blade window (25) arranged in the drill shank (35) and spring-loaded so as to be displaceable transversely to the longitudinal axis of the combined tool (13, 21), wherein the drill body (13) comprising the drill bit (1) and the drill shank (35) is made of a solid hard metal material, and wherein a spring-loaded, displaceable control bolt (5) is located in a central longitudinal bore (36) of the solid hard metal drill, the front tip (15) of said bolt controlling the transverse displacement of the chamfering blade (4), which is transversely displaceable within the blade window (25).

10 Claims, 8 Drawing Sheets (52) U.S. Cl.
CPC .......... *B23B 51/105* (2013.01); *B23B 51/108* (2013.01); *B23B 2220/04* (2013.01); *B23B 2222/28* (2013.01); *B23B 2251/02* (2013.01); *B23B 2251/426* (2013.01); *B23B 2251/50* (2013.01); *Y10T 408/8583* (2015.01)

(56) References Cited

U.S. PATENT DOCUMENTS

| | | | |
|---|---|---|---|
| 7,261,498 B2 * | 8/2007 | Hecht | B23B 27/141 407/113 |
| 2004/0208717 A1 | 10/2004 | Greenhalgh | |

FOREIGN PATENT DOCUMENTS

| | | | | |
|---|---|---|---|---|
| CN | 203817469 U | * | 9/2014 | |
| CN | 201420230599.3 | | 10/2014 | |
| DE | 1477224 A | | 10/1969 | |
| DE | 102004054989 A1 | | 5/2006 | |
| DE | 102009005275 A1 | | 7/2010 | |
| JP | 57-73015 | | 5/1982 | |
| JP | 11-512979 | | 11/1999 | |
| JP | 2002-28809 | | 1/2002 | |
| WO | 2005/037473 A1 | | 4/2005 | |
| WO | WO 2015025492 A1 | * | 2/2015 | ............. B28D 1/146 |

OTHER PUBLICATIONS

English translation of German Search Report, 6 pages.
Certification of English Translation of German Search Report, dated Mar. 2, 2016, 1 page.
Japanese Search Report from corresponding Japanese Application 2016-083412, dated May 19, 2017, 4 pages.
English Translation of Japanese Search Report, 6 pages.
English Translation of Chinese Patent No. 201120432027, 3 pages.
English Translation of Chinese Patent No. 201420230599, 7 pages.

* cited by examiner

COMBINED DRILL AND CHAMFER TOOL

The invention relates to a combined drill and chamfer tool according to the preamble of claim 1.

Already known is a combined drill and chamfer tool ascribed to the same applicant, which is characterized by a drill bit screwed into a cylindrical steel body. The drill bit consists of a conventional spiral drill, which forms a cutting bit in a known manner and which supports on its rear portion a threaded extension, which is screwed into a dedicated mounting bore at the front end of the steel body.

A known combined drill and chamfer tool of this type is intended for producing blind bores and/or through bores in a workpiece, wherein, after being inserted into the bore, a chamfer is produced on at least one edge of the bore. The known combined drill and chamfer tool comprises a drill bit, which is mounted rotationally fixed in a base body, and a chamfering blade disposed behind the drill bit in the axial direction and mounted in a blade window so as to be displaceable in a spring-loaded manner, transversely to the longitudinal axis of the combined tool.

With this prior art it was therefore known to provide a blade window, formed in the steel body and extending transversely to the longitudinal axis of the steel body, behind the threaded extension for holding the drill bit, in which window a chamfering blade was arranged so as to be displaceable in a spring-loaded manner in the transverse direction. This arrangement allowed a bore to be first produced, after which at least one bore edge could be chamfered in the workpiece.

With this prior art, a bore was first produced in a workpiece, and once the drill had been passed all the way through the workpiece, the combined tool was retracted opposite the drilling direction so as to enable back deburring (chamfering) of the bore edge.

It was also known in the prior art to form the chamfering blade as double-sided or as cutting on both sides, i.e. both the front side and the rear side of the finished bore could be provided with a suitable cutting chamfer.

The prior art had the disadvantage that the cylindrical base body in which the deburring tool (chamfering blade) is arranged had to have a front mounting bore, and the drill was screwed via a rear threaded insert into the front mounting bore of the base body so as to be exchangeable. This left no additional space in the longitudinal direction for attaching the chamfering or deburring blade directly axially onto the drill.

This resulted in the disadvantage that an unused axial length (fitting length) was created behind the drill helix and the chamfering blade, which made using the combination tool disadvantageous. Particularly when deburring small diameter holes, i.e. diameters less than 5 mm, the tool was susceptible to transverse deflection and was therefore unstable, due to the undesirable but technically essential axial distance (fitting length) between drill helix and chamfering blade. The axial region in which the front mounting bore was formed for mounting the threaded extension of the drill in the direction of the transversely extending blade window was not capable of accommodating high torques due to the unusable axial length (fitting length) and the threaded receptacle for the drill shank provided there.

In the prior art, it was heretofore known only to produce the base body for the deburring tool from a (unhardened) steel material, however this was associated with the disadvantage that the base body cannot be diamond-coated and has a short lifespan.

This resulted in the disadvantage that chip removal from the transversely displaceable deburring or chamfering tool, arranged spring-loaded in a blade window of the base body, led to premature wear and tear in the region of the blade window and the region of the rotational mount of the deburring or chamfering blade, because neither the blade window nor the rotational mount of the deburring or chamfering blade could be made of hard metal or diamond coated. The material pairing of a hardened drill bit screwed into an unhardened and uncoatable base body of a deburring or chamfering blade was therefore disadvantageous.

DE 1 477 224 A1 discloses only a hard metal drill connected via a solder joint or a weld seam to a softer tool shank. It is an object of the present invention to avoid this.

From US 2004/0208717 A1, a drill having cutting blades integrated into the drill shank is known. Such a deburring tool is possible only for very large diameters of more than 10 mm because an eccentrically rotating drive for the cutting blades, which are displaceable radially toward the outside, is provided, and this is not practicable with small diameters. Therefore such a tool cannot be miniaturized to diameters of less than 5 mm.

From WO 2005/037473 A1, a further combined drill and chamfer tool is known, which has the disadvantage that the base body including the drill helix, which is provided for chip removal, is made not of a hard metal material but of a routine, relatively soft HSS tool steel, and is therefore incapable of accommodating the high torques produced with tool diameters of less than 6 millimeters. Cutting tips made of a hard metal material are soldered or screwed onto the drill helix made of HSS tool steel.

The disadvantage of this arrangement is that a base body made of tool steel which extends integrally into the drill helix is not suitable for miniaturization. If such a part were to be further decreased in diameter, the high levels of torque acting on it during machining could no longer be transmitted, causing the drill shank to break.

Experience has shown that drills made solely of tool steel can be miniaturized only to a minimum diameter of 6 mm. Diameters smaller than this cannot be realized with drills made of tool steel with hard metalcutting edges.

If such miniaturization is attempted with a relatively soft tool steel, the hard metalcutting edge must also be soldered to the tip of the drill helix, which is associated with substantial complexity, high production costs and problems with service life.

An additional disadvantage of a combined drill and chamfer tool according to WO 20057037473 A1 is that with the relatively large diameter, a space-consuming mechanism for the pivot drive of the deburring blade is disposed in the drill shank. This prevents further miniaturization, since the use of a spiral spring wrapped around a pivot bolt, with the opposite end of said spring held in a retaining bolt which is also embodied as adjustable, results in a space-consuming mechanism.

It is therefore the object of the invention to develop a combined drill and chamfer tool of the type specified in the introductory part of the description such that, even when deburring small diameters, particularly less than 5 mm, stable guidance of the drill and of the chamfering blade acting transversely thereto is possible, and such that the tool as a whole is able to withstand higher loads and is more wear-resistant.

To attain the stated object, the invention is characterized by the technical teaching of claim 1.

The following provides a clarification of the terms "drill", "hard metal", "tool steel" and "HSS" used herein:

1. A drill comprises shank and bit. The drill shank transmits the torque to the drill bit, guides the drill bit, enables removal of the drill cuttings and ensures the infeed of a cooling lubricant. The drill bit performs the work of chip removal.

2. Spiral drills have a conical bit, traditionally with a point angle of 118° (HSS drill) or 142° (hard metal drill). Since the cutting geometry is designed for machining metals, this type is also referred to as a metal drill.

3. Twist drills are made of high-speed steel (HSS; high-speed cutting steel), with simple drills being made of chromium-vanadium steels (CV steel). For extreme applications in tough metals, hard metal drills are available.

4. The hardness and wear-resistance of these drills can be further increased by various coatings, e.g. titanium aluminum nitrides (TiAlN→purple coloring, AlTiN→anthracite), titanium carbo-nitride (TiCN→brownish-black coloring) or titanium nitride (TiN→gold coloring). Coated drills are also characterized by high corrosion resistance, a long lifespan and substantially increased feed rates and cutting speeds. Coated drills are most frequently used in CNC processing.

5. For machining hardened steel, manganese steel, hard cast iron, fiber-reinforced composite materials or concrete, drills that have inserted hard metalcutting edges or solid hard metal drills are used. In automated machine tools as well, solid hard metal drills have largely replaced HSS drills, due to their substantially higher cutting speed and better surface hardness.

6. Solid hard metal drills can be distinguished from traditional HSS drills by a somewhat higher weight and darker metal color. Also, they frequently have a tapered shank, so that the mounting surface fits into the collet chuck of a machine tool. Depending on the hardness of the material to be machined, a solid hard metal drill can have a point angle of up to 140°. Finally, a designation such as "K10/F20" provides an indication of the type of hard metal used.

Thus according to the invention, a combined drill and chamfer tool embodied as a metal drill is used as a solid hard metal drill.

It is a feature of a first embodiment of the invention that a drill body embodied as a solid hard metal drill is inserted into a base body, which may be made of any sleeve-shaped material, e.g. a metal, a plastic, or some other material, wherein the front end of the drill forms the drill bit, and in a region of the drill directly adjoining the drill bit, the drill supports a transversely extending blade window for the deburring or chamfering blade inserted there.

This technical teaching results in the advantage that, in principle, a drill body is now claimed which comprises an integrated and therefore materially integral solid hard metal drill, the front end of which is embodied as a drill bit, and the rear end of which is now made of the same material as the drill bit, and that a blade window is now inserted into this solid hard metal drill bit, in which the deburring or chamfering blade is arranged so as to be transversely displaceable.

It is therefore a feature of the invention that the drill shank is made of a hard metal, and in this hard metal material, immediately adjacent to the drill helix, the blade window for inserting a deburring blade is located, and in that the pivoting of the deburring blade is implemented by means of a spring-loaded axial bolt, arranged with the axial direction thereof at the center of the drill shank Space-consuming spring arms are dispensed with and in their place, a cylindrical compression spring aligned in the axial direction is used. Only by using such a small actuating mechanism can the combined drill and chamfer tool be miniaturized to a diameter of less than 5 millimeter.

The drill bit together with a drill shank attached integrally thereto form a drill body made of hard metal and/or coated with hard metal, which has a continuous central interior bore.

This feature is not found in the present document WO 2005/037473 A1, as in that document, the drill shank is made of a soft tool steel, onto the front tip of which the cutting edges made of hard metal are soldered or screw-connected.

The invention is distinguished over document WO 2005/037473 A1 in that now the blade window in which the chamfering blades are mounted so as to be transversely displaceable has been moved to the area of the hard metal or the hard metal-coated part.

This results in the advantage that, according to the invention, the blade window in which the deburring or chamfering blade is spring-loaded so as to be transversely displaceable is disposed in an integral solid hard metal drill.

This is an essential difference over the prior art, because in the prior art a two-part configuration was separated in terms of material such that a drill bit made e.g. of hard metal or HSS material was screwed into an unhardened steel base body attached therebehind, and the base body was made of a relatively soft material (e.g. ST37 iron or HSS). The blade window and the rotational mount of the deburring or chamfering blade were therefore positioned in the relatively soft metal material of the base body and were exposed to greater wear from chip removal.

In addition, the undesirably large axial distance (fitting distance) between the drill bit and the deburring or chamfering blade resulted in transverse deflection and torsion problems, particularly with drill diameters of less than 5 mm.

The invention is distinguished therefrom and now provides that a transversely extending blade window is integrated into the drill shank of a drill, wherein the chamfering blade is inserted into said blade window and is embodied as spring-loaded so as to be adjustable and displaceable in the transverse direction relative to the longitudinal axis of the drill shank.

The invention thus provides a continuous drill shank in a solid hard metal drill, therefore the drill shank and preferably also the drill bit are embodied as fully integral and are made of the same hardened and/or hard metal-coated metal material.

The present invention therefore offers the advantage that, since the drill shank is made of a hard metal, it can be further miniaturized because the particularly space-saving pivot mechanism for the cutting blade is arranged in the drill shank, and also because, even if the drill shank is miniaturized to a diameter of less than 5 mm, it can still transmit high enough torques that the placement of a blade window in the drill shank with a chamfering blade that is transversely displaceable therein will not cause the drill shank to break, even when transmitting high torques.

In a first embodiment of the invention it is provided that the drill as a whole, comprising drill bit and drill shank attached integrally thereto, are made of a hard metal material. This results in the advantage that this hard metal material can be filled with CVD particles to produce increased cutting performance and increased strength.

This technical teaching produces the advantage that the drill bit can be resharpened when it becomes worn, and since the drill bit can be sharpened multiple times, the chamfering blade does not have to be replaced.

It is a further advantage that the solid hard metal drill as a whole, comprising drill bit and drill shank, is embodied according to the invention as a drill body, which is configured as an insert and which is inserted into a mounting bore, open toward the front at the front end face, in a sleeve-shaped base body, and secured there.

The solid hard metal drill (comprising drill bit and drill shank integrally connected thereto) can be secured in various ways. For example, the solid hard metal drill can be screwed, pressed or shrink-fit into the mounting bore of the base body, or clamped therein with the help of side screws or similar clamping means.

What is important is that now the blade window is immediately adjacent to the rear side of the spiral drill helix, and therefore the fitting length between the last flute of the drill bit and the front edge of the chamfering blade, viewed as detrimental, is dispensed with.

Thus it is clear that the chamfering blade is immediately adjacent to the drill helix of the drill bit, and only a relatively small axial intermediate space for a fitting length is required, which ranges, e.g. from 0.01 to 2 mm.

Because the chamfer system is integrated into the drill bit of the solid hard metal drill, i.e. is immediately adjacent to the last drill flute of the drill bit without a substantial distance therebetween, the advantage is produced that the fitting length previously required for screwing in a threaded extension on the shank of the drill is eliminated, resulting in a short active structural length for use in cramped drilling spaces.

At the same time, the compact spatial arrangement of chamfering blade and drill bit results in excellent properties in terms of vibration prevention, centering ability, concentricity and other advantageous characteristics, in particular bending strength and torque transmission stability.

According to a further embodiment, the rear base body is no longer configured as a sleeve that receives the shank, made of hard metal, of the solid hard metal drill, in the manner of a shrink-fit connection or adhesive connection. In this case, an adapter sleeve is pressed directly into the drill shank, and the actuating means, specifically the compression spring having a suitable adjusting screw, is located in the adapter sleeve. The adapter sleeve can have the same diameter as the drill shank.

In another embodiment, it can be provided that the diameter of the adapter sleeve is slightly (e.g. within a range of 0.05 to 0.2 millimeter) smaller than the diameter of the drill shank. These dimensions prevent any eccentricities that may exist in the connection of the two parts from impacting the overall concentricity of the tool clamped in the chuck when the bearing surfaces of the chuck reach beyond the length of the drill shank and extend into the region of the adapter sleeve. In this case, only the drill shank and not the adapter sleeve is clamped in the chuck. Thus the outer diameter of the adapter sleeve is free in relation to the chuck and has no impact on clamping quality.

All embodiments that use an adapter sleeve have the advantage that the drill shank made of hard metal can be clamped along with the attached adapter sleeve of the same or reduced diameter directly into the chuck of a rotary drive; this is not possible in the other embodiments since in those embodiments, only the base body made of soft steel could be clamped into the chuck.

This second embodiment therefore also results in advantages in terms of the transmission of force and torque to the chuck.

The subject matter of the present invention results not only from the subject matter of the individual claims, but also from the combination of the individual claims with one another.

All specifications and features disclosed in the documents, including the abstract, particularly the spatial configuration shown in the drawings, are claimed as essential to the invention to the extent that they are novel, individually or in combination, over the prior art.

Where individual subjects are characterized as "essential to the invention" or "important", this does not necessarily mean that these subjects must form the subject of an independent claim. This is determined solely by the applicable version of the independent claim in each case.

In the following, the invention will be specified in greater detail in reference to a set of drawings showing a plurality of embodiments. Additional features that are essential to the invention and advantages of the invention also proceed from the set of drawings and the description thereof.

The drawings show:

FIG. 8: a modified embodiment of a combined drill and chamfer tool Document WO 2005/037473 A1 corresponds in principle to the prior art as described in FIGS. 1 to 2 of the present application, since said document specifies that the blade window with the deburring blade transversely displaceable therein is disposed in the soft part of the drill shank, which is associated with the above-described disadvantages.

Therefore, WO 2005/037473 A1 discloses only one variant of the prior art according to FIGS. 1 and 2, described in the following.

Figure 1:
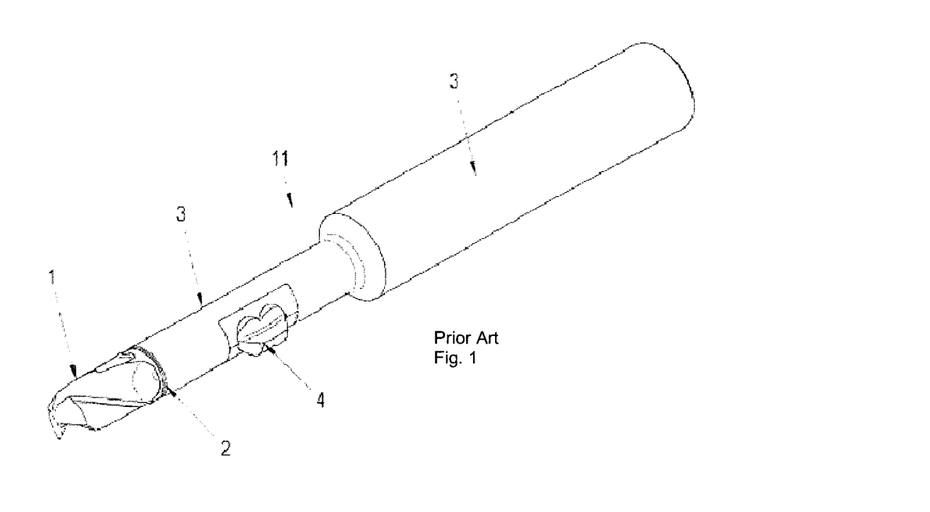
FIG. 1: a perspective representation of a combined drill and chamfer tool according to the prior art
Figure 2:
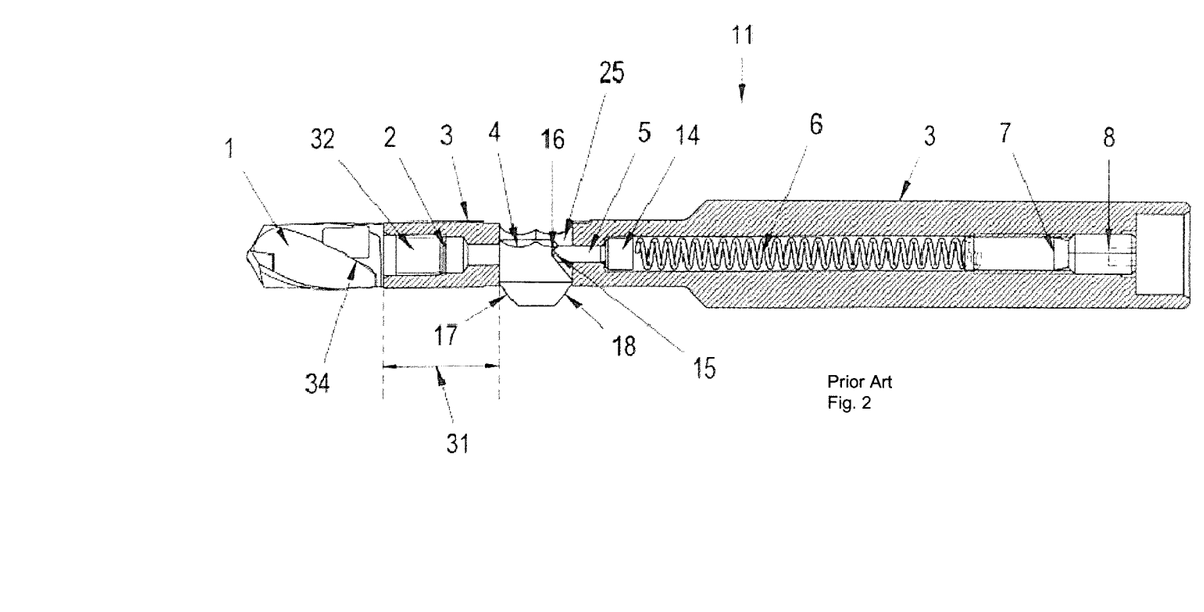
FIG. 2: a sectional view of the combined drill and chamfer tool according to the prior art
Figure 3:
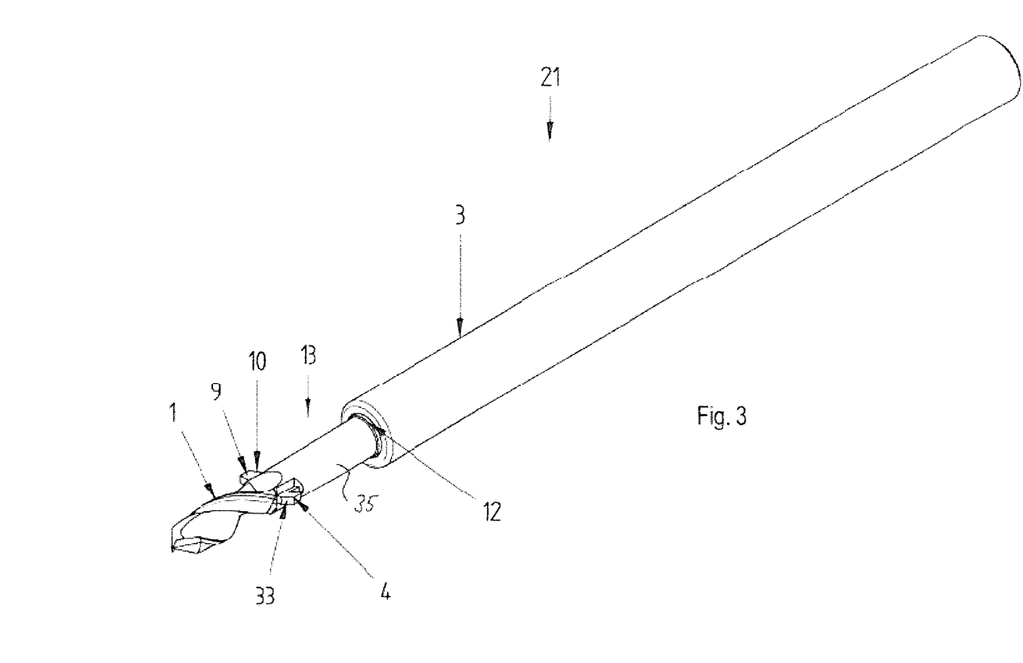
FIG. 3: a perspective representation of the novel combined drill and chamfer tool according to the invention

FIGS. 1 and 2 show a conventional combined drill and chamfer tool according to the prior art, in which a central longitudinal bore is disposed in a base body 3, into which a compression spring 6 is inserted. Compression spring 6 is pushed forward by means of a spacer bolt 7 and a tightening bolt 8 situated rearward thereof, and is pressed against a cylindrical attachment 14, which is preferably integrally connected to a control bolt 5. Control bolt 5 thus engages at its front tip 15 into an assigned control groove 16 of a chamfering blade 4, which is therefore arranged spring-loaded in the transverse direction so as to be transversely displaceable in a blade window 25.

In the embodiment example according to the prior art shown, chamfering blade 4 is designed to cut in the forward and the reverse direction. It thus has a cutting edge 17 that faces the forward direction and a cutting edge 18 that faces the reverse direction.

What is important here is that, beyond blade window 25, an additional cylindrical attachment is provided in base body 3 in the prior art according to FIGS. 1 and 2, because a mounting bore must be provided in this forward region, into which a threaded extension 32 of a drill bit 1 can engage. Threaded extension 32 is provided with a receiving thread 2, which is used for screwing drill bit 1 into base body 3.

Drill helix 34 of drill bit 1 therefore ends before the mounting bore into which threaded extension 32 is screwed. This results in the disadvantage that an awkward fitting length 31 that would ideally be avoided is formed between the rear end of drill helix 34 and the front end of blade window 25.

It is an object of the invention to eliminate or at least substantially minimize this fitting length 31.

The critical step in achieving this object will be described in reference to a combined drill and chamfer tool 21, which is illustrated in detail in the subsequent FIGS. 3 to 8.

Figure 6:
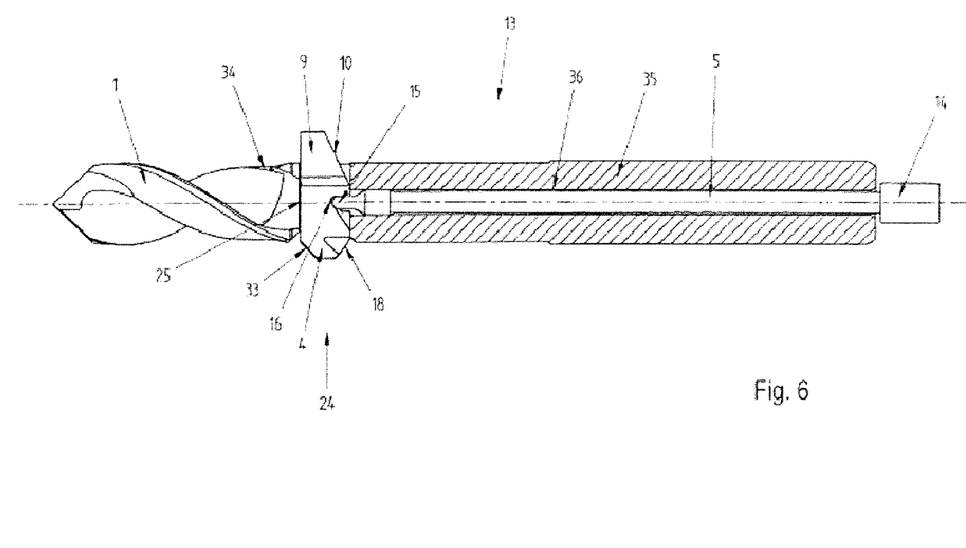
FIG. 6: a detailed representation of the drill body, inserted into the base body

According to the invention, drill bit 1 according to FIG. 6 is integrally connected to a drill shank 35 in an embodiment of a solid hard metal drill such that a continuous drill body 13 is formed, at the front end of which a blade window 25 is located, in which chamfering blade 4 is displaceably mounted.

Figure 4:
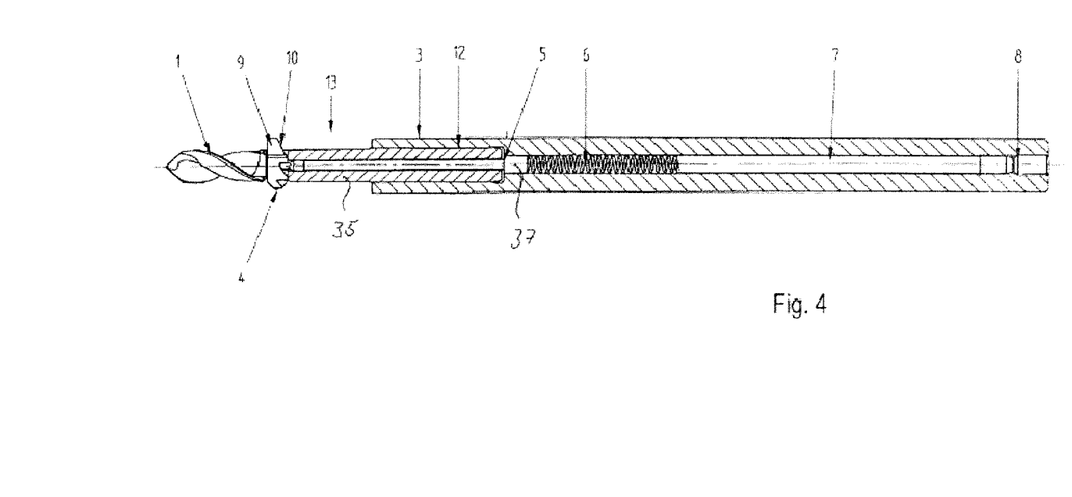
FIG. 4: a sectional view of the assembly of FIG. 3

In drill shank 35, a central longitudinal bore is located, into which control bolt 5 extends, with control bolt 5 being capped off at the rear by attachment 14, to which it is connected; according to the representation of FIG. 4, attachment 14 then extends into a base body 3, embodied as shortened, where it is spring-loaded by known compression spring 6.

Thus for the first time, a drill made of solid hard metal and having a forward drill bit 1 and a drill shank 35 is now described, wherein transversely extending blade window 25 is arranged in the region of drill shank 35, thereby eliminating fitting length 31 because according to the invention, the chamfering blade is now located within drill shank 35 itself.

Thus it is now possible for the first time to produce drill bit 1 in drill shank 35 from the same material, so that blade window 25 and chamfering blade 4 inserted therein are embodied as especially resistant to chip impacts and as flexurally stable.

Due to the shortened length—elimination of fitting length 31—blade window 25 is now situated immediately adjacent to drill helix 34 in the axial direction, as is illustrated mostly clearly in FIG. 6.

The entire drill body 13 is inserted into a mounting bore 12 in a sleeve-type base body 3 according to FIG. 4, and can be secured in mounting bore 12 in any desired manner. Drill shank 35 of drill body 13 can be secured there by screwing, snap-locking, shrink-fitting, pressing or by other methods, with an interlocking connection that is capable of withstanding heavy loads being particularly preferred.

It is an additional feature of the invention that now the chamfering blade is designed to cut on only one side, specifically with a rear cutting edge 18, although the invention is not limited to this. FIGS. 3 to 7 show such a single-edged chamfering blade 4 merely as a possible embodiment example.

It is also possible for a double-edged chamfering blade to be used, as shown in FIGS. 1 and 2. Rather than providing a single cutting edge 18 that cuts toward the rear, a cutting edge 17 that cuts forward may thus also be provided in the embodiment example according to FIGS. 3 to 7.

A further feature of the invention is the simple mounting of chamfering blade 4, which is particularly advantageous for deburring small diameters. As is clear from FIG. 6, the chamfering blade according to FIG. 5 has a conically tapering lead-in profiled part 9, and the chamfering blade as a whole is inserted in the direction of arrow 24 into blade window 25 at the bottom according to FIG. 6, with lead-in chamfer 10 being supported against tip 15 of control bolt 5, which projects, spring-loaded, into blade window 25, and sliding therealong, specifically until tip 15 reaches the region of control groove 16 of chamfering blade 4, where it snaps into place.

As soon as this mounting position according to FIG. 6 has been reached, lead-in profiled part 9 can be broken off. Thus it also serves as a handle for use in installing chamfering blade 4.

Figure 7:
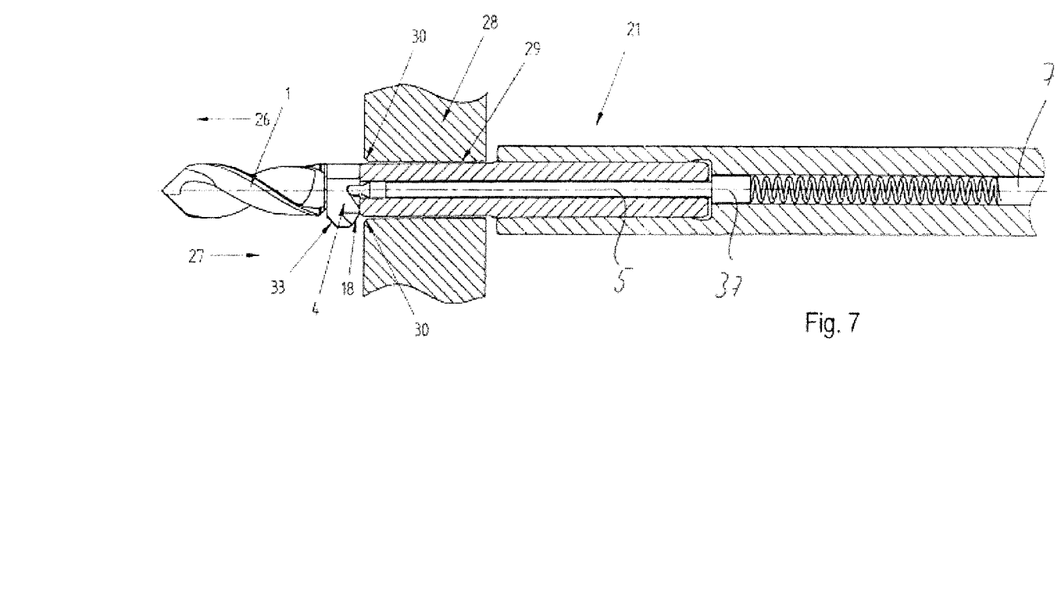
FIG. 7: a representation similar to FIG. 6 showing additional details during the drilling process and during the deburring process

For this purpose, lead-in profiled part 9 is embodied as weakened in the transverse cross-section by two mutually opposing transverse grooves 22, 23 where a breaking web 20 is formed, so that when lead-in profiled part 9 is bent around breaking web 20, breaking web 20 breaks, placing the blade in its final working position according to FIG. 7.

Figure 5:
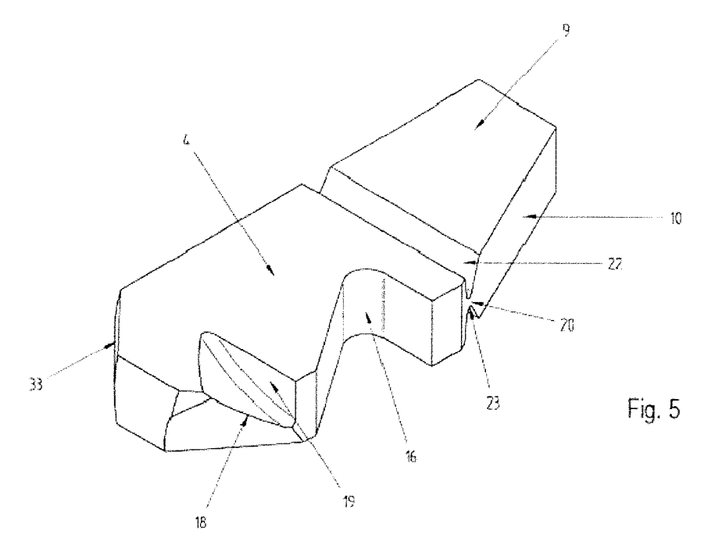
FIG. 5: a perspective view of the chamfering blade

FIG. 5 also shows that a chip deflector 19 is provided in a known manner on cutting edge 18.

FIG. 7 shows combined drill and chamfer tool 21 according to the invention in a working position.

In this drawing, the drill with its drill bit 1 has already produced a workpiece bore 29 in a workpiece 28, and has already been passed through said workpiece bore 29. This passage has been carried out in the direction of arrow 26.

Combined drill and chamfer tool 21 as a whole is then retracted in the direction of arrow 27, so that the rear end of chamfering blade 4 rests with its cutting edge 18 against the front bore edge, where it produces an angled chamfer 30.

As is also clear, the front side of chamfering blade 4 also has a lead-in chamfer 33, which ensures that when the drill with its drill bit 1 enters workpiece bore 29, chamfering blade 4 will be pushed back into the interior profile of blade window 25 and will not exert any cutting action in the region of workpiece bore 29.

In any case, what is important is that blade window 25 along with the chamfering blade, which is spring-loaded here so as to be displaceable in a transverse direction, is disposed in the drill, which is made of a continuous solid hard metal.

As a result, it is now possible for the first time to produce the drill as an integrated part together with the chamfering blade, and to later secure it in a softer, sleeve-shaped base body suitable for this purpose.

The invention also provides for a plurality of chamfering blades 4 (more than one) to be arranged in a blade window 25 or—in another variant—for a second and optionally a third blade window to be provided at an axial distance from the one blade window 25, with a chamfering blade being arranged in each additional window. Each of the chamfering blades can be mounted and controlled by the common control bolt 5 so as to be transversely displaceable in its assigned blade window. In another embodiment, each chamfering blade can be assigned its own control bolt 5, spring-loaded in the axial direction.

As is clear from FIG. 6, control bolt 5 is arranged spring-loaded and axially displaceably in longitudinal bore 36 of drill body 13.

Figure 8:
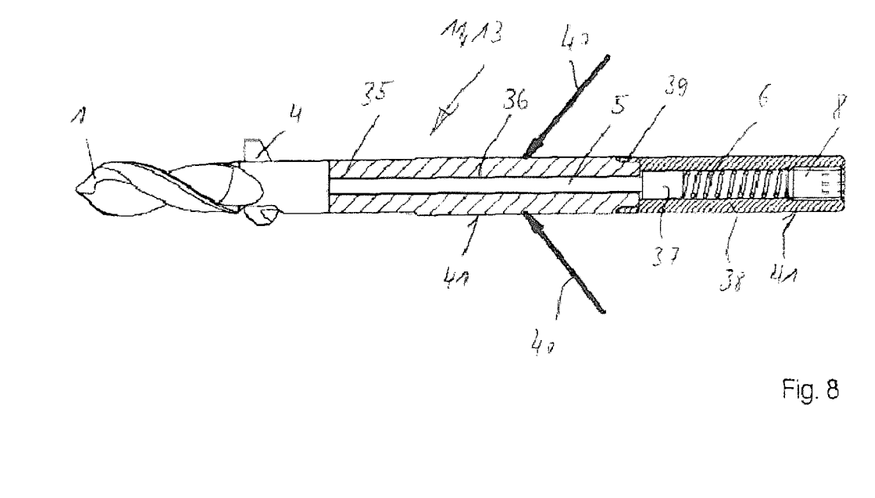

FIG. 8 shows a modified embodiment example in which an adapter sleeve 38, the outer diameter 41 of which corresponds to outer diameter 41 of drill shank 35, is connected in a rotationally fixed manner in the region of a connection 39 to the rear end face of drill shank 35.

The actuating means for the displacement of control bolt 5 is disposed in adapter sleeve 38. Control bolt 5 is extended toward the rear by a head piece 37 of enlarged diameter, with head piece 37 extending into a center bore of adapter sleeve 38. One end of compression spring 6 is supported against head piece 37, while the other end is supported against tightening bolt 8, which is screwed into a threaded bore at the rear end of adapter sleeve 38.

Since outer diameter 41 of drill shank 35 is preferably identical to outer diameter 41 of adapter sleeve 38, it is now possible to clamp drill shank 35, which is made of a solid hard metal material, directly into chuck 40 of a drive machine. Base body 3 is thus eliminated, and the drive torque can be transmitted from chuck 40 directly to drill shank 35.

LIST OF REFERENCE SYMBOLS

1 drill bit
2 receiving thread
3 base body
4 chamfering blade
5 control bolt
6 compression spring
7 spacer bolt
8 tightening bolt
9 lead-in profiled part
10 lead-in chamfer
11 combined drill and chamfer tool
12 mounting bore
13 drill body
14 attachment (of 5)
15 tip (of 5)
16 control groove
17 cutting edge (forward)
18 cutting edge (rearward)
19 chip deflector
20 breaking web
21 combined drill and chamfer tool
22 transverse groove (top)
23 transverse groove (bottom)
24 arrow direction
25 blade window
26 arrow direction
27 arrow direction
28 workpiece
29 workpiece bore
30 chamfer
31 fitting length
32 threaded extension
33 lead-in chamfer
34 drill helix
35 drill shank
36 longitudinal bore
37 head piece
38 adapter sleeve
39 connection
40 chuck
41 outer diameter

The invention claimed is:

1. A combined drill and chamfer tool for producing boreholes in a workpiece and for subsequently producing a chamfer on at least one bore edge of the borehole, comprising a drill bit, a drill shank, and at least one chamfering blade arranged behind the drill bit in the axial direction, said chamfering blade being mounted in a blade window arranged in the drill shank and spring-loaded so as to be displaceable transversely to the longitudinal axis of the combined tool, wherein a drill body comprising the drill bit and the drill shank is made of a solid hard metal material, and in that a spring-loaded, displaceable control bolt is located in a central longitudinal bore of the solid hard metal drill body, a front tip of said bolt controlling the transverse displacement of the chamfering blade, which is transversely displaceable within the blade window, and wherein an adapter sleeve, a diameter of which is equal to or smaller than that of the drill shank, is fastened onto a rear part of the drill shank, with a spring of the spring-loaded displaceable control bolt being arranged in the adapter sleeve.

2. The combined drill and chamfer tool according to claim 1, wherein a fitting length, defined as an axial distance between an end of a drill helix and a beginning of the blade window, ranges from about 0.001 mm to about 2 mm.

3. The combined drill and chamfer tool according to claim 1, wherein a diameter of the drill bit is less than or equal to about 5 mm.

4. The combined drill and chamfer tool according to claim 1, wherein the chamfering blade is embodied as cutting on one side or on two sides.

5. The combined drill and chamfer tool according to claim 1, wherein the chamfering blade has a conically tapering lead-in profiled part which can be broken off.

6. The combined drill and chamfer tool according to claim 1 wherein the adapter sleeve is pressed directly onto the drill shank, and wherein the spring is a compression spring, and the compression spring and an adjustment screw for the compression spring are arranged within the adapter sleeve.

7. The combined drill and chamfer tool according to claim 1 wherein the adapter sleeve has the same diameter as the drill shank.

8. The combined drill and chamfer tool according to claim 1 wherein the diameter of the adapter sleeve is smaller than the diameter of the drill shank by about 0.05 mm to about 0.2 mm.

9. The combined drill and chamfer tool according to claim 1, the tool being adapted to be clamped in a chuck having clamping surfaces, the tool being further adapted such that the clamping surfaces of the chuck reach beyond the length of the drill shank and extend up to the area of the adapter sleeve.

10. The combined drill and chamfer tool according to claim 9 wherein the drill shank is adapted to be clamped in the chuck but the adapter sleeve is adapted to not be clamped in the chuck.

* * * * *